(12) United States Patent
Tochihara et al.

(10) Patent No.: US 9,637,594 B2
(45) Date of Patent: May 2, 2017

(54) XYLYLENE DIAMINE COMPOSITION, AND METHOD FOR PRODUCING POLYAMIDE RESIN

(71) Applicant: Mitsubishi Gas Chemical Company, Inc., Tokyo (JP)

(72) Inventors: Tatsuya Tochihara, Niigata (JP); Katsumi Shinohara, Niigata (JP); Takashi Nakamura, Niigata (JP); Hajime Yamada, Niigata (JP); Jun Mitadera, Kanagawa (JP); Takashi Yamamoto, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 15/032,020

(22) PCT Filed: Oct. 29, 2014

(86) PCT No.: PCT/JP2014/078734
§ 371 (c)(1),
(2) Date: Apr. 25, 2016

(87) PCT Pub. No.: WO2015/064626
PCT Pub. Date: May 7, 2015

(65) Prior Publication Data
US 2016/0304671 A1 Oct. 20, 2016

(30) Foreign Application Priority Data

Oct. 31, 2013 (JP) .................... 2013-227257
Oct. 31, 2013 (JP) .................... 2013-227258

(51) Int. Cl.
*C08G 69/26* (2006.01)
*C08G 69/28* (2006.01)
*C08G 59/50* (2006.01)
*C08G 69/30* (2006.01)

(52) U.S. Cl.
CPC ............ *C08G 69/28* (2013.01); *C08G 59/50* (2013.01); *C08G 59/5033* (2013.01); *C08G 69/26* (2013.01); *C08G 69/265* (2013.01); *C08G 69/30* (2013.01)

(58) Field of Classification Search
CPC ................ C08G 59/50; C08G 69/26
See application file for complete search history.

(56) References Cited

U.S. PATENT DOCUMENTS

| 2003/0023028 A1* | 1/2003 | Tanaka ............. C08G 69/04 528/310 |
| 2005/0004399 A1* | 1/2005 | Amakawa .......... C07C 209/48 564/415 |
| 2005/0277790 A1* | 12/2005 | Kanamori .......... C07C 209/48 564/305 |
| 2007/0270613 A1* | 11/2007 | Sugawara .......... C07C 209/48 564/415 |
| 2009/0226729 A1* | 9/2009 | Niimoto ........... C08G 59/4007 428/416 |
| 2012/0128532 A1 | 5/2012 | Kashiba et al. |
| 2012/0172512 A1 | 7/2012 | Ishii et al. |

FOREIGN PATENT DOCUMENTS

| JP | H11-158370 A | 6/1999 |
| JP | 2008-050403 A | 3/2008 |
| JP | 2011-236285 A | 11/2011 |
| WO | 2011/030911 A1 | 3/2011 |

OTHER PUBLICATIONS

International Search Report date of mailing Jan. 20, 2015 for PCT/JP2014/078734 and English translation of the same. (4 pages).

* cited by examiner

*Primary Examiner* — Gregory Listvoyb
(74) *Attorney, Agent, or Firm* — Fitch, Even, Tabin & Flannery LLP

(57) ABSTRACT

Provided are [1] a xylylenediamine composition containing xylylenediamine and a compound represented by the following general formula (1), wherein the content of the compound represented by the general formula (1) is 0.001 to 0.1 parts by mass based on 100 parts by mass of the xylylenediamine; and a method for producing a polyamide resin including the steps of introducing a compound represented by the following general formula (1), a diamine including xylylenediamine (but excluding the compound represented by the general formula (1)), and a dicarboxylic acid into a reaction system and performing a polycondensation reaction, wherein the amount of the compound represented by the general formula (1) to be introduced is 0.001 to 0.1 parts by mass based on 100 parts by mass of the xylylenediamine, where, in the general formula (1), n and m each independently represent an integer of 0 to 6, excluding the case where n and m are both 1.

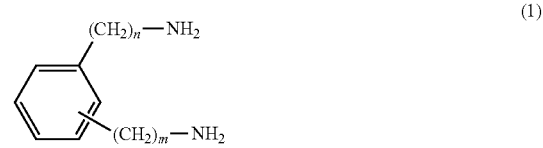

(1)

15 Claims, No Drawings

XYLYLENE DIAMINE COMPOSITION, AND METHOD FOR PRODUCING POLYAMIDE RESIN

CROSS-REFERENCE TO RELATED APPLICATIONS

This application is a U.S. national phase application filed under 35 U.S.C. §371 of International Application PCT/JP2014/078734, filed on Oct. 29, 2014, designating the United States, which claims priority from Japanese Application Number 2013-227257, filed Oct. 31, 2013, and Japanese Application Number 2013-227258, filed Oct. 31, 2013, which are hereby incorporated herein by reference in their entirety.

TECHNICAL FIELD

The present invention relates to a xylylenediamine composition and a method for producing a polyamide resin.

BACKGROUND ART

Xylylenediamine is a compound useful as a raw material for polyamide resin, an epoxy resin curing agent, and a raw material for isocyanate compound or the like. Polyamide resin using xylylenediamine as a main diamine component are excellent in mechanical properties such as strength, elastic modulus and others, and are therefore useful as various molding materials. In addition, the polyamide resins are excellent in gas barrier performance against oxygen, carbon dioxide gas and others, and are therefore useful also as packaging materials.

In the case of using a polyamide resin for a molding material or the like and in order to improve molding processability or the like of the polyamide resin, it is known to add a crystal nucleating agent to the polyamide resin, thereby improving a crystallization rate (PTL 1). In addition, for improving the chemical resistance and the strength of polyamide resin, a method of adding a crystal nucleating agent or a resin component having high crystallinity to polyamide resin to thereby increase the degree of crystallization of the resin is known.

However, the case where a crystal nucleating agent or the like is added to a polyamide resin requires an additional step of mixing the crystal nucleating agent to the polyamide resin before molding. In addition, when the dispersed condition of the crystal nucleating agent is nonuniform in the polyamide resin, there is a concern that mechanical physical properties and transparency of the molded articles of a composition containing a polyamide resin are often lowered.

CITATION LIST

Patent Literature

PTL 1: JP-AH11-158370

SUMMARY OF INVENTION

An object of the present invention is to provide a xylylenediamine composition which can be used as a raw material for polyamide resin, an epoxy resin curing agent, or a raw material for isocyanate compound or the like, and in particular, when used as a raw material for polyamide resin, can increase the crystallization rate and the crystallinity degree of polyamide resin and can provide a polyamide resin that has high transparency.

In addition, another object of the present invention is to provide a method for producing a polyamide resin using xylylenediamine as a diamine component, which can produce a polyamide resin capable of readily producing molded articles that have high transparency, and in which the crystallization rate and the crystallinity degree of the polyamide resin can be increased without degrading the physical properties thereof.

The present inventors have found that by incorporating a specified amount of a specified compound into xylylenediamine, and by reacting a diamine containing xylylenediamine with a dicarboxylic acid under a specified condition, the above-mentioned problems can be solved.

Specifically, the present invention provides [1] a xylylenediamine composition containing xylylenediamine and a compound represented by the following general formula (1), wherein the content of the compound represented by the general formula (1) is 0.001 to 0.1 parts by mass based on 100 parts by mass of the xylylenediamine; and [2] a method for producing a polyamide resin including the steps of introducing a compound represented by the following general formula (1), a diamine including xylylenediamine (but excluding the compound represented by the general formula (1)), and a dicarboxylic acid into a reaction system and performing a polycondensation reaction, wherein the amount of the compound represented by the general formula (1) to be introduced is 0.001 to 0.1 parts by mass based on 100 parts by mass of the xylylenediamine:

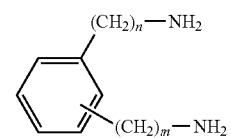

(1)

wherein n and m each independently represent an integer of 0 to 6, excluding the case where n and m are both 1.

When the xylylenediamine composition of the present invention is used as a raw material for polyamide resin, a polyamide resin that has a high crystallization rate and a high crystallinity degree while maintaining high transparency can be obtained. In addition, the xylylenediamine composition of the present invention is also suitable for various applications for an epoxy resin curing agent and the like, or as a raw material for isocyanate compound.

Furthermore, according to the present invention, even when a polyamide resin is produced on the basis of hitherto-known production conditions for polyamide resin, a polyamide resin having a high crystallization rate and a high crystallinity degree can be produced without degrading the physical properties of the polyamide resin. With the increase in the crystallization rate thereof, the molding processability of the polyamide resin is improved, and with the increase in the crystallization degree thereof, the chemical resistance and the strength of the polyamide resin are improved. In addition, when the polyamide resin is used, molded articles that have high transparency can be produced, and therefore the polyamide resin can be favorably used as a material for packaging films, hollow containers, various molding materials, fibers, etc.

DESCRIPTION OF EMBODIMENTS

[Xylylenediamine Composition]

The xylylenediamine composition of the present invention (hereinafter also referred to simply as "composition of the present invention" or "composition") contains xylylenediamine and a compound represented by the above-mentioned general formula (1), wherein the content of the compound represented by the general formula (1) is 0.001 to 0.1 parts by mass based on 100 parts by mass of the xylylenediamine.

<Xylylenediamine>

The xylylenediamine which is used in the composition of the present invention is preferably m-xylylenediamine, p-xylylenediamine, or a mixture thereof, and from the viewpoint of gas barrier properties of the resulting polyamide resin, the xylylenediamine is more preferably m-xylylenediamine. In addition, on processing into an injection molding material, from the viewpoints that the molding cycle is fast and that the strength and appearance of a molded article are improved, the xylylenediamine is more preferably a mixture of m-xylylenediamine and p-xylylenediamine.

The composition of the present invention contains xylylenediamine as a main component, and a content of the xylylenediamine in the composition is preferably 99.5% by mass or more, and more preferably 99.9% by mass or more.

It should be noted that the content of the xylylenediamine in the composition may be measured by, for example, gas chromatography (GC) analysis or the like.

As the xylylenediamine which is used in the composition of the present invention, industrially available xylylenediamine may be suitably used. Although such xylylenediamine sometimes contains a trace amount of impurities, there is no particular fault in the present invention.

The industrially available xylylenediamine may be produced by adopting a known method. For example, in the case where the xylylenediamine is m-xylylenediamine, examples of a production method thereof include a method of allowing m-xylene, ammonia, and an oxygen-containing gas to react with each other in the presence of a catalyst by a continuous reaction or a batch reaction, followed by hydrogenating formed isophthalonitrile; and the like.

<Compound Represented by General Formula (1)>

The composition of the present invention contains a predetermined amount of a compound represented by the following general formula (1).

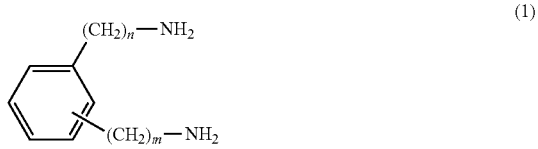

(1)

wherein n and m each independently represent an integer of 0 to 6, excluding the case where n and m are both 1.

Accordingly, when the xylylenediamine composition of the present invention is used as a raw material for polyamide resin, the resultant polyamide resin maintains high transparency and has a high crystallization rate and a high crystallinity degree. With the increase in the crystallization rate of the polyamide resin, the molding processability thereof improves, and therefore the time for the crystallization step in molding can be shortened, and the productivity of molded articles can be improved. In addition, when the composition of the present invention is used, the crystallinity degree of the resultant polyamide resin can be high and therefore the chemical resistance and the strength thereof improve.

According to the present invention, the above-mentioned effects can be realized, and therefore problems of degradation of mechanical physical properties and transparency owing to addition of a crystal nucleating agent for improving the molding processability and the chemical resistance of polyamide resin can be avoided.

In the above-mentioned general formula (1), preferably, n and m each independently represent an integer of 0 to 3, more preferably an integer of 0 to 2. However, like in the above, the case where n and m are both 1 is excluded.

Preferred examples of the compound represented by the general formula (1) include compounds represented by the following formulae (a) to (c). From the viewpoint of realizing the above-mentioned effects, at least one selected from aminoethylbenzylamine represented by the following formula (a) and phenylenediamine represented by the following formula (b) is more preferred, and aminoethylbenzylamine represented by the formula (a) is still more preferred.

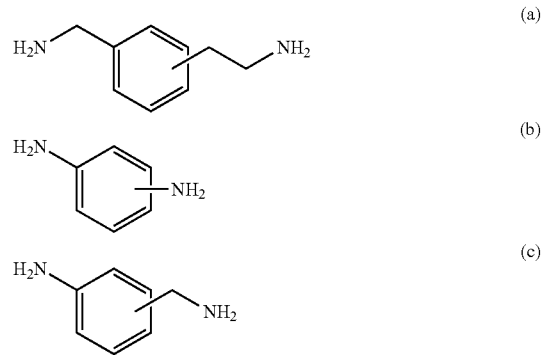

The content of the above-mentioned compound in the composition is 0.001 to 0.1 parts by mass based on 100 parts by mass of xylylenediamine therein, preferably 0.001 to 0.05 parts by mass, more preferably 0.002 to 0.05 parts by mass. When the content of the compound in the composition is less than 0.001 parts by mass based on 100 parts by mass of xylylenediamine therein, and when the composition is used as a raw material, the crystallization rate of the resultant polyamide lowers and, as a result, the molding processability of the polyamide resin therefore worsens. Further, the crystallinity degree of the polyamide resin also lowers. On the other hand, when the content of the compound in the composition is more than 0.1 parts by mass based on 100 parts by mass of xylylenediamine therein, and when the composition is used as a raw material, the crystallinity degree of the resultant polyamide resin lowers.

In the present invention, "the content of the compound represented by the general formula (1)" means the total compound corresponding to the general formula (1), but preferably the composition contains only one kind of the compound. In the present invention, plural position isomers of the compound are considered as one kind of the compound.

Although a reason why the above-described effects are obtained by using the composition of the present invention as a raw material for polyamide resin is not always elucidated yet, as for the effect for improving the crystallization rate of the polyamide resin and for the effect for increasing the crystallinity degree thereof, it may be considered that the compound represented by the above-mentioned general formula (1) may promote the crystal nucleus formation in the polyamide resin, or the compound itself serves as a starting point of the crystal nucleus formation, thereby providing the effect of a crystal nucleating agent. In general, when a different structure is introduced into a crystalline polyamide resin, the crystallinity of the resin tends to lower, but the present inventors have found that, by introducing the above-mentioned specific compound into the reaction system, the crystallinity degree of the polyamide resin increases against all expectations.

In addition, in the xylylenediamine, there may be the case where an amino group in the molecule deteriorates at the storage to generate a trace amount of ammonia; however, it has also been found that the generation amount of ammonia is decreased due to the presence of the above-mentioned compound. From this matter, in view of the fact that the xylylenediamine composition contains the compound, an effect that the storage stability of the xylylenediamine is improved may also be expected.

Although a reason why the generation amount of ammonia is decreased is not always elucidated yet, it may be assumed that an effect for preventing the generation of a radical or its chain is brought due to some interaction between xylylenediamine and the compound.

The xylylenediamine composition of the present invention may be obtained by using commercially available xylylenediamine and the compound represented by the general formula (1) and controlling an amount of the compound relative to the xylylenediamine to a prescribed range. In addition, in producing xylylenediamine, so long as it is possible to control the catalyst used or the production condition to a specified constitution and to perform the reaction so as to form a prescribed amount of the compound in parallel, there are exemplified a method of utilizing it; and the like. In this case, the content of the compound in the composition may be determined by gas chromatography (GC) analysis or the like. For example, there are exemplified a method in which a xylylenediamine composition containing the compound is subjected to GC measurement, and the amount of the compound relative to xylylenediamine is determined from a ratio of a peak value assigned to the compound to a peak value assigned to the xylylenediamine; and the like.

The xylylenediamine composition of the present invention may be suitably used for a raw material for polyamide resin, an epoxy resin curing agent, a raw material for isocyanate compound, or the like.

In particular, the case where the xylylenediamine composition of the present invention is used for a raw material for polyamide resin is preferred from the standpoint that a polyamide resin that has a high crystallization rate and a high crystallinity degree while maintaining high transparency may be produced. In the case where the xylylenediamine composition of the present invention is used as an epoxy resin curing agent, it realizes long-term storability and excellent handleability since the xylylenediamine storage stability is enhanced, and in addition, the epoxy resin curing agent may have a low viscosity since the compound represented by the general formula (1) imparts suitable flowability thereto, and consequently, the appearance of the coating film to be obtained may also be excellent. Further, the compound represented by the general formula (1) has an effect of increasing the curing rate of an epoxy resin curing agent and is therefore favorable in point of the ability to improve working efficiency.

In the case where the xylylenediamine composition of the present invention is used as a raw material for polyamide resin, for example, a diamine component containing the xylylenediamine composition of the present invention and a dicarboxylic acid component are introduced into a reaction system and are reacted for polycondensation according to a known method to produce a polyamide resin.

In the case where the xylylenediamine composition of the present invention is used as an epoxy resin curing agent, the xylylenediamine composition of the present invention may be used as a curing agent directly as it is; or a reaction product produced by reacting the xylylenediamine composition of the present invention with a carbonyl group-containing compound such as a carboxylic acid or a derivative thereof according to a known method may be used as an epoxy resin curing agent. Examples of the carboxylic acid derivative include carboxylic acid anhydrides and acid chlorides.

For producing the epoxy resin curing agent, if desired, any other component may be used concurrently.

In addition, the xylylenediamine composition of the present invention is also favorable as a raw material for isocyanate compound. The isocyanate compound is used as a raw material for urethane resin and urea resin.

[Production Method for Polyamide Resin]

The production method for a polyamide resin of the present invention includes the steps of introducing a compound represented by the above-mentioned general formula (1), a diamine containing xylylenediamine (but excluding a compound represented by the general formula (1)), and a dicarboxylic acid into a reaction system and performing a polycondensation reaction, wherein the amount of the compound represented by the general formula (1) to be introduced is 0.001 to 0.1 parts by mass based on 100 parts by mass of the xylylenediamine. The compound represented by the general formula (1) and the preferred range thereof are the same as mentioned above.

Including the above-mentioned step, the polyamide resin obtained according to the production method of the present invention can have a high crystallization rate and a high crystallinity degree while maintaining high transparency. With the increase in the crystallization rate of the polyamide resin, the molding processability thereof improves, and therefore the time for the crystallization step in molding can be shortened and the productivity of molded articles can be thereby improved. In addition, by introducing the above-mentioned compound represented by the general formula (1) into the reaction system, the crystallinity degree of the polyamide resin increases and the chemical resistance and the strength thereof are thereby improved.

According to the production method of the present invention, the above-mentioned effects can be realized, and therefore problems of degradation of mechanical physical properties and transparency owing to addition of a crystal nucleating agent for improving the molding processability and the chemical resistance of polyamide resin can be avoided.

The amount of the compound represented by the general formula (1) to be introduced into the reaction system is 0.001 to 0.1 parts by mass based on 100 parts by mass of xylylenediamine in the xylylenediamine-containing diamine, preferably 0.001 to 0.05 parts by mass, more preferably 0.002 to 0.05 parts by mass. When the amount of the compound introduced is less than 0.001 parts by mass based on 100 parts by mass of xylylenediamine, the crystallization rate lowers and, as a result, the molding processability of the polyamide resin may worsen. In addition, the crystallinity degree of the polyamide resin also lowers. When the amount of the compound introduced is more than 0.1 parts by mass based on 100 parts by mass of xylylenediamine, the crystallinity degree of the polyamide resin lowers.

In the production method of the present invention, "the amount of the compound represented by the general formula (1) introduced" means the total amount of the compound corresponding to the general formula (1), but preferably only one kind of the compound is used. In the present invention, plural position isomers of the compound are considered as one kind of the compound.

Although a reason why the above-described effects are obtained by introducing a predetermined amount of the compound into the reaction system for polycondensation is not always elucidated yet, as for the effect for improving the crystallization rate of the polyamide resin and increasing the crystallinity degree thereof, it may be considered that the compound represented by the general formula (1) may promote the crystal nucleus formation in the polyamide resin, or the compound itself serves as a starting point of the crystal nucleus formation, thereby exhibiting the effect of crystal nucleating agent.

In general, when a different structure is introduced into a crystalline polyamide resin, the crystallinity of the resin tends to lower, but the present inventors have found that, by introducing the above-mentioned specific compound into the reaction system, the crystallinity degree of the polyamide resin increases against all expectations.

The production method for a polyamide resin of the present invention preferably uses the above-mentioned xylylenediamine composition of the present invention, but is not limited to using it.

<Diamine Containing Xylylenediamine>

The diamine which is used in the production method of the present invention is a diamine containing xylylenediamine (hereinafter also referred to simply as "diamine"). However, the diamine excludes a compound represented by the above-mentioned general formula (1). The xylylenediamine is preferably m-xylylenediamine, p-xylylenediamine, or a mixture thereof, and more preferably m-xylylenediamine from the viewpoint of gas barrier properties of the resulting polyamide resin. By using the xylylenediamine-containing diamine, the resulting polyamide resin is excellent in melt moldability, mechanical properties, and gas barrier properties.

A content of the xylylenediamine in the diamine is preferably 70 mol % or more, more preferably 80 to 100 mol %, and still more preferably 90 to 100 mol %. So long as the content of the xylylenediamine in the diamine falls within the foregoing range, the resulting polyamide resin is excellent in melt moldability, mechanical properties, and gas barrier properties.

Examples of other diamine compound than the xylylenediamine, which is contained in the diamine, may include aliphatic diamines, such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, 2,4,4-trimethylhexamethylenediamine, etc.; alicyclic diamines, such as 1,3-bis(aminomethyl)-cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)-propane, bis(aminomethyl) decalin, bis(aminomethyl)tricyclodecane, etc.; diamines having an aromatic ring, such as bis(4-aminophenyl) ether, paraphenylenediamine, bis(aminomethyl)-naphthalene, etc.; and the like; however, the diamine compound is not limited thereto. These diamines may be used solely or in combination of two or more kinds thereof <Dicarboxylic Acid>

Although the dicarboxylic acid which is used in the production method of the present invention is not particularly limited, from the viewpoints of molding processability, gas barrier properties, and mechanical properties, it is preferably at least one selected from an aliphatic dicarboxylic acid having 4 to 20 carbon atoms, terephthalic acid, and isophthalic acid, more preferably an aliphatic dicarboxylic acid having 4 to 20 carbon atoms, and still more preferably an aliphatic dicarboxylic acid having 4 to 12 carbon atoms.

Examples of the aliphatic dicarboxylic acid having 4 to 20 carbon atoms may include succinic acid, glutaric acid, adipic acid, pimelic acid, suberic acid, azelaic acid, sebacic acid, 1,10-decanedicarboxylic acid, 1,11-undecanedicarboxylic acid, 1,12-dodecanedicarboxylic acid, 1,14-tetradecanedicarboxylic acid, 1,16-hexadecanedicarboxylic acid, 1,18-octadecanedicarboxylic acid, and the like. Of these, at least one selected from adipic acid and sebacic acid is preferably used from the viewpoints of crystallinity and high elasticity. These dicarboxylic acids may be used solely or in combination of two or more kinds thereof Examples of other dicarboxylic acid which may be used as the dicarboxylic acid include aliphatic dicarboxylic acid having 3 carbon atoms or less, such as oxalic acid, malonic acid, etc.; and other aromatic dicarboxylic acids than terephthalic acid and isophthalic acid, such as 2,6-naphthalenedicarboxylic acid, etc.

A content of the aliphatic dicarboxylic acid having 4 to 20 carbon atoms in the dicarboxylic acid is preferably 50 mol % or more, more preferably 70 to 100 mol %, and still more preferably 85 to 100 mol %. So long as the content of the aliphatic dicarboxylic acid having 4 to 20 carbon atoms in the dicarboxylic acid falls within the foregoing range, the resulting polyamide resin is excellent in molding processability, gas barrier properties, and mechanical properties.

The polycondensation reaction between a diamine and a dicarboxylic acid is not particularly limited, and any method, such as a pressurization method, an atmospheric dropping method, etc., is applicable. As an example thereof, there is exemplified a method of performing melt polycondensation (melt polymerization).

Specifically, there is exemplified a method in which a salt composed of a diamine and a dicarboxylic acid is heated in the presence of water in an atmospheric pressure or pressurized state and subjected to polycondensation in a molten state while removing the added water and water formed by the polycondensation. In addition, there is also exemplified a method in which a diamine is added directly to a dicarboxylic acid in a molten state, followed by performing polycondensation at atmospheric pressure or under an elevated pressure. In this case, in order to keep the reaction system in a uniform liquid state, the diamine and the dicarboxylic acid are continuously added, and meanwhile, the polycondensation is advanced while subjecting the reaction system to temperature rise in such a manner that a reaction temperature is not lower than melting points of the formed oligoamide and polyamide, Among the foregoing, it is preferred to adopt the melt polymerization method in which a diamine is added dropwise in a molten dicarboxylic acid at atmospheric pressure or under an elevated pressure, and the mixture is polymerized in a molten state while removing condensed water, because the molecular weight distribution of the polyamide resin may be made small.

A method of introducing the compound represented by the general formula (1) into the reaction system is not particularly limited. For example, there are exemplified a method of introducing the compound directly into the polycondensation reaction system; and a method of introducing a mixture of the raw material diamine or dicarboxylic acid and the compound into the reaction system. For example, the above-described xylylenediamine composition of the present invention may be used as the mixture of the raw material diamine and the compound represented by the general formula (1).

In addition, in the production of xylylenediamine which is used in the present invention, so long as it is possible to control the catalyst used or the production condition to a specified constitution and to perform the reaction so as to form a prescribed amount of the compound represented by the general formula (1) in parallel, there are exemplified a method of utilizing it; and the like. In this case, the content of the compound in the xylylenediamine may be measured by gas chromatography (GC) analysis or the like. For example, there are exemplified a method in which xylylenediamine containing the compound is subjected to GC measurement, and the content of the compound is determined from a ratio of a peak value assigned to xylylenediamine and a peak value assigned to the compound; and the like.

A molar ratio of the diamine and the dicarboxylic acid (diamine/dicarboxylic acid) is preferably in the range of 0.9 to 1.1, more preferably in the range of 0.93 to 1.07, still more preferably in the range of 0.95 to 1.05, and yet still more preferably in the range of 0.97 to 1.02. So long as the molar ratio falls within the foregoing range, an increase in the molecular weight is apt to be advanced.

In addition, for the purpose of promoting the amidation reaction, a phosphorus atom-containing compound may be added within the polycondensation reaction system. Examples of the phosphorus atom-containing compound include phosphinic acid compounds, such as dimethylphosphinic acid, phenylmethylphosphinic acid, etc.; hypophosphorous acid compounds, such as hypophosphorous acid, sodium hypophosphite, potassium hypophosphite, lithium hypophosphite, magnesium hypophosphite, calcium hypophosphite, ethyl hypophosphite, etc.; phosphonic acid compounds, such as phosphonic acid, sodium phosphonate, potassium phosphonate, lithium phosphonate, potassium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate, potassium ethylphosphonate, etc.; phosphonous acid compounds, such as phosphonous acid, sodium phosphonite, lithium phosphonite, potassium phosphonite, magnesium phosphonite, calcium phosphonite, phenylphosphonous acid, sodium phenylphosphonite, potassium phenylphosphonite, lithium phenylphosphonite, ethyl phenylphosphonite, etc.; phosphorous acid compounds, such as phosphorous acid, sodium hydrogenphosphite, sodium phosphite, lithium phosphite, potassium phosphite, magnesium phosphite, calcium phosphite, triethyl phosphite, triphenyl phosphite, pyrophosphorous acid, etc.; and the like.

Of these, in particular, hypophosphorous acid metal salts, such as sodium hypophosphite, potassium hypophosphite, lithium hypophosphite, etc., are preferably used because they promote the amidation reaction, with sodium hypophosphite being especially preferred. It should be noted that the phosphorus atom-containing compound which may be used in the present invention is not limited to these compounds.

An addition amount of the phosphorus atom-containing compound which is added to the polycondensation reaction system is preferably 0.1 to 1,000 ppm, more preferably 1 to 600 ppm, and still more preferably 5 to 400 ppm in terms of a phosphorus atom concentration in the polyamide resin.

In addition, from the viewpoint of controlling a polycondensation reaction rate, an alkali metal compound may be allowed to be further coexistent within the polymerization reaction system.

As the alkali metal compound, an alkali metal hydroxide or an alkali metal acetate is usually used. However, the above-described phosphorus atom-containing compounds containing an alkali metal are excluded. Examples of the alkali metal compound include lithium hydroxide, sodium hydroxide, potassium hydroxide, rubidium hydroxide, cesium hydroxide, lithium acetate, sodium acetate, potassium acetate, rubidium acetate, cesium acetate, and the like, and at least one selected from sodium hydroxide and sodium acetate is preferred. These alkali metal compounds may be used solely or in combination of two or more kinds thereof.

It should be noted that the alkali metal compound may be added within the polycondensation reaction system, or may be one originated from the dicarboxylic acid that is a raw material for polyamide resin.

A use amount of the alkali metal compound is preferably 0.05 to 1,000 ppm, more preferably 0.5 to 600 ppm, still more preferably 2.5 to 400 ppm, in terms of an alkali metal atom concentration in the polyamide resin. The use amount is a total amount of the alkali metal compound added within the polycondensation system and the alkali metal compound originated from the dicarboxylic acid that is a raw material for polyamide resin.

In addition, as for the use amount of the alkali metal compound, a value obtained by dividing a molar number of the alkali metal compound by a molar number of the above-described phosphorus atom-containing compound is usually a value in the range of 0.5 to 1.0, and the use amount is a value in the range of preferably 0.55 to 0.95, and more preferably 0.6 to 0.9. So long as the use amount falls within the foregoing range, the amidation reaction proceeds at an appropriate rate.

The phosphorus atom concentration and the alkali metal atom concentration in the polyamide resin may be measured by a known method, such as ICP emission spectral analysis, ICP mass analysis, X-ray photoelectron spectroscopic analysis, etc.

A temperature of the polycondensation reaction is preferably 150 to 300° C., more preferably 160 to 280° C., and still more preferably 170 to 270° C. So long as the polymerization temperature falls within the foregoing range, the polymerization reaction is rapidly advanced. In addition, thermal decomposition of the monomers, or the oligomers, polymers, or the like on the way of polymerization hardly takes place, and therefore, properties of the resulting polyamide resin become favorable.

A time of the polycondensation reaction is usually 1 to 5 hours after starting the dropwise addition of the diamine. So long as the polycondensation reaction time falls within the foregoing range, the molecular weight of the polyamide resin may be thoroughly increased, and coloration of the resulting polyamide resin may be suppressed.

The thus obtained polyamide resin is taken out from a polymerization tank and pelletized, and the resulting pellets are then used upon drying or crystallization, if desired.

In addition, in order to increase a polymerization degree of the polyamide resin, the production method of the present invention may further include the step of performing solid-phase polymerization. The solid-phase polymerization may be performed by a known method, and for example, there is exemplified a method of performing heating in a nitrogen atmosphere at a temperature of 100° C. or higher and lower than a melting point of the polyamide resin for 1 to 24 hours.

As a heating device to be used for drying or solid-phase polymerization, a continuous heat drying device, a rotary drum-type heating device called a tumble dryer, a conical dryer, or a rotary dryer, and a cone-shaped heating device equipped with a rotary blade on its inside, called a Nauta mixer, may be suitably used. However, the heating device is not limited thereto, and a known device may be used.

From the viewpoints of moldability and mechanical properties, a relative viscosity of the thus produced polyamide resin is preferably in the range of 1.0 to 5.0, and more preferably in the range of 1.5 to 4.0. Specifically, the relative viscosity of the polyamide resin may be measured by the method described in the working examples.

From the viewpoints of melt moldability and mechanical properties, a number average molecular weight (Mn) of the polyamide resin resulting from the production method of the present invention is in the range of preferably 10,000 to 50,000, and more preferably 12,000 to 40,000. It should be noted that specifically, the number average molecular weight of the polyamide resin may be measured by the method described in the working examples.

By using the polyamide resin obtained according to the production method of the present invention, molded articles having high transparency can be produced. In addition, it is possible to avoid problems of reduction in the transparency of the polyamide resin owing to addition of a crystal nucleating agent thereto, and therefore, when the polyamide resin is formed into a film having a thickness of 100 µm, the haze thereof may be controlled to be preferably 10% or less, more preferably 5% or less, even more preferably 2% or less, still more preferably 1% or less, especially more preferably 0.2% or less. The haze value may be measured by using a turbidity meter (Model: COH-300A, manufactured by Nippon Denshoku Industries Co., Ltd.), and specifically, the haze value may be measured by the method described in the working examples.

In addition, the polyamide resin obtained according to the production method of the present invention may have a crystallization rate higher than that in the case where the amount of the compound represented by the above-mentioned general formula (1) introduced into the reaction system is less than 0.001 parts by mass based on 100 parts by mass of xylylenediamine in the diamine to be used. For that reason, the molding processability of the polyamide resin is improved, so that a crystallization process time at the molding may be shortened, namely the molding cycle becomes fast, whereby the productivity of a molded article may be improved. In addition, problems such as lowering in mechanical physical properties of the molded article, etc., which may be caused by a crystal nucleating agent added for improving the molding processability of the polyamide resin, may be avoided.

The crystallization rate of polyamide resin may be evaluated by measuring the semi-crystallization time. Here, the semi-crystallization time means the time taken until crystallization has proceeded by a half in the case where a crystalline material changes from a molten state to a crystallized state, and a material having a shorter semi-crystallization time can be said to have a higher crystallization rate.

The semi-crystallization time of the polyamide resin to be obtained according to the production method of the present invention is preferably 100 seconds or less, more preferably 90 seconds or less, even more preferably 88 seconds or less, still more preferably 85 seconds or less. Specifically, the semi-crystallization time may be measured according to the method described in the working examples.

The polyamide resin obtained according to the production method of the present invention may have a crystallinity degree higher than that in the case where the amount of the compound represented by the general formula (1) introduced into the reaction system is less than 0.001 parts by mass based on 100 parts by mass of xylylenediamine in the diamine to be used. The crystallinity degree of the polyamide resin may be evaluated by measuring the melting heat quantity thereof. A higher melting heat quantity means that the crystallization of the crystalline polyamide resin has proceeded and therefore the amorphous part has decreased and the crystallinity degree of the resultant polyamide resin has thereby increased.

According to the production method of the present invention, the melting heat quantity of the resultant polyamide resin can be increased by 1 J/g or more, more preferably 2 J/g or more, as compared with the case where the compound represented by the general formula (1) is not introduced into the reaction system. Specifically, the melting heat quantity may be measured according to the method described in the working examples.

The YI value measured according to JIS K7373 of the polyamide resin obtained according to the production method of the present invention may be preferably within a range of −20 to 5, more preferably −20 to 2.

It should be noted that the polyamide resin may be compounded with additives, such as a delustering agent, a heat stabilizer, a weathering stabilizer, an ultraviolet absorber, a plasticizer, a flame retardant, an antistatic agent, an anti-coloring agent, an anti-gelling agent, etc., if desired so long as properties thereof are not impaired.

The polyamide resin resulting from the production method of the present invention may be molded into a variety of forms by a conventionally known molding method. Examples of the molding method may include molding methods, such as injection molding, blow molding, extrusion molding, compression molding, vacuum molding, press molding, direct blow molding, rotational molding, sandwich molding, two-color molding, etc.

In view of the fact that the polyamide resin resulting from the production method of the present invention is fast in crystallization rate, the crystallization process time at the molding may be shortened, namely the molding cycle becomes fast, whereby the productivity may be improved. In addition, the polyamide resin obtained according to the production method of the present invention has a high crystallinity degree and is therefore excellent in chemical resistance and strength and is suitable for packaging films, hollow containers, various molding materials, fibers, and the like. In addition, since the molded article is not impaired in transparency, it is especially suitable for packaging films, hollow containers, and the like, for which high transparency is required.

EXAMPLES

The present invention is hereunder described in more detail by way of Examples, but it should not be construed that the present invention is limited thereto. It should be noted that measurement for a variety of items in the Examples was performed by the following methods.

<Relative Viscosity>

0.2 g of a polyamide resin obtained in each of the Examples and Comparative Examples was weighed accurately and dissolved in 20 mL of 96% sulfuric acid with stirring at 20 to 30° C. After the polyamide resin was dissolved completely, 5 mL of the solution was immediately taken into a Canon-Fenske viscometer and allowed to stand in a thermostat bath at 25° C. for 10 minutes, and then a falling time (t) was measured. In addition, a falling time (to) of the 96% sulfuric acid itself was measured in the same way. A relative viscosity was calculated from t and to according to the following equation.

Relative viscosity=$t/t_0$

<Number Average Molecular Weight (Mn)>

A number average molecular weight of a polyamide resin obtained in each of the Examples and Comparative Examples was determined as follows. Namely, first of all, a sample was dissolved in a phenol/ethanol mixed solvent and a benzyl alcohol solvent, respectively, and a carboxyl terminal group concentration and an amino terminal group concentration were determined by means of neutral titration with hydrochloric acid and a sodium hydroxide aqueous solution, respectively. The number average molecular weight was determined from quantitative values of the amino terminal group concentration and the carboxyl terminal group concentration according to the following equation.

Number average molecular weight=$2\times 1,000,000/([NH_2]+[COOH])$ $[NH_2]$: Amino terminal group concentration (μeq/g)

[COOH]: Carboxyl terminal group concentration (μeq/g)

<Haze Value>

Polyamide resin pellets obtained in each of the Examples and Comparative Examples were dried, and the dried pellets were extruded under a condition of the melting point+20° C. by a uniaxial extruder, thereby fabricating a film having a thickness of 100 μm. A haze value was measured by the transmission method using a turbidity meter (Model: COH-300A, manufactured by Nippon Denshoku Industries Co., Ltd.).

<Semi-Crystallization Time>

Using polyamide resin pellets obtained in each of the Examples and Comparative Examples, a film having a thickness of 100 μm was fabricated in the same way as described above. The film was sandwiched between cover glasses and melted and held at a temperature of the melting point of the polyamide resin+30° C. for 3 minutes, and immediately thereafter, the resultant was cooled by an oil bath at 160° C. A semi-crystallization time was measured by the depolarization light intensity method with a crystallization rate analyzer (Model: MK701, manufactured by Kotaki Seisakusho Co., Ltd.).

<Melting Heat Quantity>

According to a differential scanning calorimetric (DSC) method, the melting heat quantity was determined using DSC-60 manufactured by Shimadzu Corporation. Polyamide resin pellets obtained in Examples and Comparative Examples were introduced into an apparatus, and heated from 30° C. up to a temperature not lower than the expected melting point at a rate of 10° C./min. Thus the polyamide resin was melted and then rapidly cooled, and thereafter again heated up to a temperature not lower than the melting point at a rate of 10° C./min. From the areal intensity of the endothermic peak corresponding to the melting point, the melting heat quantity was obtained.

In the following Examples, m-xylylenediamine (MXDA), p-xylylenediamine (PXDA) and 1,4-phenylenediamine, all of which are manufactured by Tokyo Chemical Industry Co., Ltd., were used. 2-Aminoethylbenzylamine produced according to the method described in the following Production Example 1 was used.

Production Example 1

Production of 2-aminoethylbenzylamine

3-Isochromanone (manufactured by Sigma Aldrich Japan Corporation) was added to diethyl ether, then lithium aluminium hydride was added and stirred at room temperature for 24 hours. After the reaction, this was filtered through Celite, then the filtrate was extracted, the solvent was evaporated away with an evaporator, and thereafter the residue was purified through silica gel chromatography. The resultant synthetic product was dissolved in pyridine, and paratoluenesulfonyl chloride was added thereto and reacted at room temperature for 24 hours. After the reaction, saturated saline water was added to stop the reaction, the reaction mixture was extracted, the solvent was evaporated away with an evaporator, and thereafter the residue was purified through silica gel column chromatography. The resultant synthetic product was added to a solution of pyridine/methanol/ammonia=1/25/100 mol % in ratio, and reacted under a pressure of 2 MPaG at a temperature of 60° C. for 2 hours. After the reaction, the precipitate was collected through filtration, aqueous sodium hydroxide solution was added to the collected matter, then extracted with toluene, and the solvent was evaporated away with an evaporator. This was adsorbed to a strong acid cation exchange resin Dowex 50 WX2 (by The Dow Chemical Company), then eluted with aqueous ammonia having a concentration gradient, and the solvent was evaporated away to give 2-aminoethylbenzylamine (purity 99%).

Example 1

(Preparation of Xylylenediamine Composition)

A xylylenediamine composition was prepared in such a manner that the content of 1,4-phenylenediamine could be 0.048 parts by mass based on 100 parts by mass of m-xylylenediamine.

(Production of Polyamide Resin)

A reaction container equipped with a stirrer, a partial condenser, a total condenser, a thermometer, a dropping funnel, a nitrogen inlet tube, and a strand die was charged with 10 kg (68.43 moles) of adipic acid (manufactured by Rhodia), and after thoroughly purging with nitrogen, the resultant was further heat melted to 170° C. under a small amount of nitrogen stream while stirring the inside of the system. 9.273 kg of the thus obtained xylylenediamine composition (containing 68.08 moles of m-xylylenediamine) was added dropwise to the molten adipic acid under stirring, and the inner temperature was continuously raised to 240° C. over 2.5 hours while discharging formed condensed water to the outside of the system.

After completion of the dropwise addition of the xylylenediamine composition, the inner temperature was raised; at the point of time when the temperature reached 250° C., the inside of the reaction container was evacuated; the inner temperature was further raised; and a melt polycondensation reaction was continued at 255° C. for 20 minutes. Thereafter, the inside of the system was pressurized with nitrogen, and the resulting polymer was taken out from the strand die and pelletized, thereby obtaining a polyamide resin. The resulting polyamide resin was subjected to the above-described evaluations. The results are shown in Table 1.

Example 2

A xylylenediamine composition was prepared so that the content of 2-aminoethylbenzylamine could be 0.037 parts by mass based on 100 parts by mass of m-xylylenediamine.

Using 9.273 kg of the xylylenediamine composition (m-xylylenediamine 68.08 mol) and in the same manner as in Example 1, a polyamide resin was produced and evaluated as above. The results are shown in Table 1.

(Solid-Phase Polymerization)

500 g of the polyamide resin of Example 2 was charged in a 2-liter eggplant type flask, and after thoroughly purging with nitrogen, the polyamide resin was heated in an oil bath at 190° C. for 4 hours while evacuating, thereby performing solid-phase polymerization. The polyamide resin after the solid-phase polymerization had a relative viscosity of 2.6 and a number-average molecular weight of 22,000.

Comparative Example 1

A polyamide resin was produced in the same manner as in Example 1 except that 1,4-phenylenediamine in Example 1 was not used, and evaluated as above. The results are shown in Table 1.

Comparative Example 2

A xylylenediamine composition was prepared in the same manner as in Example 1 except that the amount of 1,4-phenylenediamine based on 100 parts by mass of m-xylylenediamine in Example 1 was changed as in Table 1.

Using the xylylenediamine composition and in the same manner as in Example 1, a polyamide resin was produced and evaluated as above. The results are shown in Table 1.

Comparative Example 3

A xylylenediamine composition was prepared in the same manner as in Example 2 except that the amount of 2-aminoethylbenzylamine based on 100 parts by mass of m-xylylenediamine in Example 2 was changed as in Table 1.

Using the xylylenediamine composition and in the same manner as in Example 2, a polyamide resin was produced and evaluated as above. The results are shown in Table 1.

Example 3, Comparative Example 4

Xylylenediamine compositions were prepared in the same manner as in Example 2, except that in Example 2, the content of 2-aminoethylbenzylamine in the xylylenediamine composition was respectively changed as shown in Table 2. In addition, polyamide resins were produced in the same manner as in Example 2, except that in the production of a polyamide resin, 0.438 g of sodium acetate/sodium hypophosphite monohydrate (molar ratio=1/1.5) was added simultaneously with charging of adipic acid, thereby performing a melt polycondensation reaction, followed by subjecting to the above-described evaluations. The results are shown in Table 2.

TABLE 2

|  |  | Unit | Example 3 | Comparative Example 4 |
|---|---|---|---|---|
| Xylylenediamine Composition | Kind of xylylenediamine | — | MXDA | MXDA |
|  | Kind of compound represented by general formula (1) | — | 2-aminoethylbenzylamine | — |
|  | Content of compound represented by general formula (1)*[1] | parts by mass | 0.02 | 0 |
| Polyamide Resin | Kind of dicarboxylic acid | — | Adipic acid | Adipic acid |
|  | Relative viscosity | — | 2.1 | 2.1 |
|  | Number average molecular weight | — | 16000 | 16000 |
|  | Haze value | % | 0.1 | 0.1 |
|  | Semi-Crystallization time | sec | 63 | 70 |
|  | Melting heat quantity | J/g | 72 | 68 |

*[1]Amount based on 100 parts by mass of xylylenediamine

It is noted from the results in Tables 1 and 2 that the polyamide resins obtained by the production method of the present invention using the xylylenediamine composition of the present invention have a higher crystallization rate and have a higher melting heat quantity therefore having a higher crystallinity degree than the polyamide resins of Comparative Examples.

When the xylylenediamine composition of the present invention is used as a raw material for polyamide resin, a polyamide resin that has a high crystallization rate and a high crystallinity degree while maintaining high transparency can be obtained. In addition, the xylylenediamine composition of the present invention is also suitable for

TABLE 1

|  |  | Unit | Example 1 | Example 2 | Comparative Example 1 | Comparative Example 2 | Comparative Example 3 |
|---|---|---|---|---|---|---|---|
| Xylylenediamine Composition | Kind of xylylenediamine | — | MXDA | MXDA | MXDA | MXDA | MXDA |
|  | Kind of compound represented by general formula (1) | — | 1,4-phenylenediamine | 2-aminoethylbenzylamine | — | 1,4-phenylenediamine | 2-aminoethylbenzylamine |
|  | Content of compound represented by general formula (1)*[1] | — | 0.048 | 0.037 | 0 | 1 | 1 |
| Polyamide Resin | Kind of dicarboxylic acid | — | Adipic acid | Adipic acid | Adipic acid | Adipic acid | Adipic acid |
|  | Relative viscosity | — | 2.1 | 2.1 | 2.1 | 2.1 | 2.1 |
|  | Number average molecular weight | — | 16000 | 16000 | 16000 | 16000 | 16000 |
|  | Haze value | % | 0.1 | 0.1 | 0.1 | 0.1 | 0.1 |
|  | Semi-Crystallization time | sec | 82 | 85 | 91 | 125 | 123 |
|  | Melting heat quantity | J/g | 72 | 73 | 68 | 45 | 46 |

*[1]Amount based on 100 parts by mass of xylylenediamine various applications for an epoxy resin curing agent and the like, or as a raw material for isocyanate compounds.

In addition, according to the present invention, there can be produced a polyamide resin having a high crystallization rate and a high crystallinity degree not degrading the physical properties of the polyamide resin even in the case where polyamide resin is produced on the basis of the production conditions for hitherto-known polyamide resins. With the increase in the crystallization rate of the polyamide resin, the molding processability thereof improves, and with the increase in the crystallinity degree thereof, the chemical resistance and the strength of the polyamide resin improve. In addition, when the polyamide resin is used, molded articles that have high transparency can be produced, and therefore the polyamide resin is favorably used for materials for packaging films, hollow containers, various molding materials, fibers, and the like.

The invention claimed is:

1. A xylylenediamine composition comprising xylylenediamine and a compound represented by the following general formula (1), wherein the content of the compound represented by the general formula (1) is 0.001 to 0.1 parts by mass based on 100 parts by mass of the xylylenediamine:

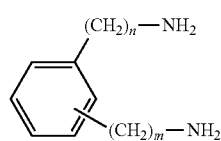

(1)

wherein n and m each independently represent an integer of 0 to 6, excluding the case where n and m are both 1.

2. The xylylenediamine composition according to claim 1, wherein the compound represented by the general formula (1) is an aminoethylbenzylamine represented by the following formula (a):

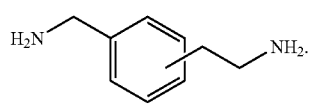

(a)

3. The xylylenediamine composition according to claim 1, wherein the xylylenediamine is m-xylylenediamine, p-xylylenediamine, or a mixture thereof.

4. The xylylenediamine composition according to claim 1, wherein the xylylenediamine is m-xylylenediamine.

5. The xylylenediamine composition according to claim 1, wherein the content of xylylenediamine is 99.5% by mass or more.

6. The xylylenediamine composition according to claim 1, which is used for a raw material for polyamide resin.

7. The xylylenediamine composition according to claim 1, which is used for an epoxy resin curing agent.

8. A method for producing a polyamide resin comprising the steps of introducing a compound represented by the following general formula (1), a diamine comprising xylylenediamine (but excluding the compound represented by the general formula (1)), and a dicarboxylic acid into a reaction system and performing a polycondensation reaction, wherein the amount of the compound represented by the general formula (1) to be introduced is 0.001 to 0.1 parts by mass based on 100 parts by mass of the xylylenediamine:

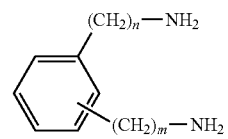

(1)

wherein n and m each independently represent an integer of 0 to 6, excluding the case where n and m are both 1.

9. The method for producing a polyamide resin according to claim 8, wherein the compound represented by the general formula (1) is an aminoethylbenzylamine represented by the following formula (a):

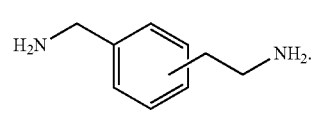

(a)

10. The method for producing a polyamide resin according to claim 8, wherein the dicarboxylic acid is at least one selected from an aliphatic dicarboxylic acid having 4 to 20 carbon atoms, terephthalic acid, and isophthalic acid.

11. The method for producing a polyamide resin according to claim 8, wherein the content of xylylenediamine in the xylylenediamine-containing diamine is 70 mol % or more, and the content of the aliphatic dicarboxylic acid having 4 to 20 carbon atoms in the dicarboxylic acid is 50 mol % or more.

12. The method for producing a polyamide resin according to claim 10, wherein the aliphatic dicarboxylic acid having 4 to 20 carbon atoms is at least one selected from adipic acid and sebacic acid.

13. The method for producing a polyamide resin according to claim 8, wherein the xylylenediamine is m-xylylenediamine, p-xylylenediamine, or a mixture thereof.

14. The method for producing a polyamide resin according to claim 8, wherein the xylylenediamine is m-xylylenediamine.

15. The method for producing a polyamide resin according to claim 8, further comprising a step of solid-phase polymerization.

* * * * *